United States Patent [19]

Tsuchiya et al.

[11] Patent Number: 4,692,811
[45] Date of Patent: Sep. 8, 1987

[54] APPARATUS FOR PROCESSING IMAGE SIGNAL

[75] Inventors: Hiroyoshi Tsuchiya, Kawasaki; Toshiharu Kurosawa, Yokohama; Hirotaka Otsuka, Tama; Yuuji Maruyama, Inagi; Katsuo Nakazato, Shinjuku, all of Japan

[73] Assignee: Matsushita Electric Industrial Co., Ltd., Osaka, Japan

[21] Appl. No.: 758,961

[22] Filed: Jul. 25, 1985

[30] Foreign Application Priority Data

| July 25, 1984 | [JP] | Japan | 59-154387 |
| July 25, 1984 | [JP] | Japan | 59-154389 |
| July 25, 1984 | [JP] | Japan | 59-154397 |
| July 25, 1984 | [JP] | Japan | 59-154398 |
| July 25, 1984 | [JP] | Japan | 59-154390 |
| July 25, 1984 | [JP] | Japan | 59-154391 |
| Aug. 16, 1984 | [JP] | Japan | 59-170657 |

[51] Int. Cl.$^4$ .............................................. H04N 1/40
[52] U.S. Cl. .................................. 358/282; 358/283; 358/284; 382/54; 382/56
[58] Field of Search ............... 358/282, 283, 280, 289; 382/9, 27, 41, 50, 54, 56

[56] References Cited

U.S. PATENT DOCUMENTS

| 4,491,963 | 1/1985 | Bellemare | 358/282 |
| 4,520,395 | 5/1985 | Abe | 358/282 |
| 4,578,711 | 3/1986 | White et al. | 358/282 |
| 4,586,089 | 4/1986 | Nakazato et al. | 358/280 |
| 4,590,606 | 5/1986 | Rohrer | 358/282 |

Primary Examiner—Edward L. Coles, Sr.
Attorney, Agent, or Firm—Wenderoth, Lind & Ponack

[57] ABSTRACT

A method for processing an image signal such that areas of original image data are sequentially scanned with a scanning window having a size corresponding to M picture elements in units of a predetermined number of picture elements so as to perform halftone display in accordance with black-and-white binary distribution with respect to the signal levels of the picture elements within the scanning window every time the scanning window is moved. The picture elements within the scanning window are assigned an order of preference in accordance with their image signal levels. A sum of the image signal levels of the picture elements within the scanning window is calculated, and A and N of the equations $S = C \times N + A$ are calculated, where C is a predetermined image signal level (e.g., black level and maximum level), N is an integer, and A is the image signal level falling within the range $O \leq A < C$. As a result of the preference operation, N picture elements are assigned a level C, the next picture element is assigned a level A, and the remaining picture elements, O. In order to impart regularity to the converted image signal distribution, additional data is added to the preference data.

17 Claims, 14 Drawing Figures

APPARATUS FOR PROCESSING IMAGE SIGNAL

BACKGROUND OF THE INVENTION

The present invention relates to an apparatus for processing an image signal having functions of halftone image reproduction in binary form.

Recently, facsimile systems have become frequently used in daily business. There arises a demand for halftone reproduction of pictorial images in addition to back-and-white binary reproduction of documents or the like. However, halftone reproduction often has many restrictions from the viewpoints of recording apparatuses and transmission systems. For example, an apparatus for recording an image on a silver chloride film used in conventional photography or a heat-sensitive printing apparatus has good recording characteristics for halftone recording. However, an electrostatic copying machine or an ink jet printing apparatus has good characteristics for binary recording. On the other hand, regarding transmission systems, digital data transmission is taking over from analog data transmission. In this field, data compression schemes are used to perform high-speed data transmission. Under these conditions, a pseudo halftone display system having a binary recording apparatus is proposed, which is suitable for digital data transmission, thereby providing an optimum fascimile system.

An electronic halftone-dot generating method for a printed image in a newspaper or magazine and a dither method for digitizing or quantizing an image signal in accordance with a threshold matrix table are typical examples of a pseudo halftone display system. However, these conventional methods have poor resolution of a two-valued (binary) image such as a character or line. Therefore, the halftone portion or binary image portion cannot help but be sacrificed.

For example, according to the dither method, in a threshold window consisting of a threshold pattern of a plurality of different threshold levels, a multilevel input image signal is compared with the threshold levels in units of picture elements. When a given picture element level of the original image data exceeds the corresponding threshold, the picture element is set to "black". Otherwise, the picture element is set to "white". In this manner, each picture element is converted to binary data. When a 4×4 matrix window is used, 16 threshold levels can be set. Therefore, halftone display having 17 levels can be performed for the original image data. In this manner, according to the conventional dither method, black elements appear in each threshold window in a number corresponding to the original image data levels, so as to represent an average halftone mode. When the window size is small, the displayed image has good resolution. In this case, however, the number of halftone levels is decreased. On the other hand, if the window size is large, the number of halftone levels is increased. However, in this case, resolution is degraded. In addition to this disadvantage, the quality of a reproduced image of a binary original image portion is degraded in accordance with the conventional dither method, as compared with general binary processing.

Some of inventors of this application previously invented an apparatus and a method for converting halftone image signals into binary signals. The method is now patent pending in United States and other countries (U.S. patent Ser. No. 501,873, now U.S. Pat. No. 4,538,184; British patent publication No. 2,129,652, etc.) The method comprises defining a successively shifted scanning window with respect to the signal level of each picture element from which said video signal has been derived, totalizing the quantum numbers of the picture elements in the scanning window corresponding to the original screen dot, and reconstructing black picture elements corresponding to the total value of the quantum numbers faithfully to the area of the original dot. This method realizes binary data reproduction with no moire pattern, but it is not sufficient to obtain both of high resolution and multiple halftone levels.

SUMMARY OF THE INVENTION

It is, therefore, an object of the present invention to provide an apparatus for processing an image signal so as to provide a displayed/recorded image of good image quality for both a binary image and a halftone image.

It is another object of the present invention to provide an apparatus for processing an image signal to obtain pseudo halftone reproduction compatible with both high resolution and multiple halftone levels.

According to the present invention, there is provided an apparatus for processing an image signal comprising,
first and second image signal memory means for storing image signal levels of picture elements which are obtained by scanning an original image in a divided manner;
a means for calculating a sum S of error correction data $E_a$ and a sum $S_m$ of the image signal levels of all picture elements within a first scanning window which a has a size corresponding to M picture elements and which scans said first image signal memory means, and obtaining N and A from:

$$S = C \times N + A$$

where C is a predetermined image signal level, N is an integer falling in a range $0 \leq N \leq M$, and A is an image signal level falling in a range $0 \leq A \leq C$;
a preference circuit means for numbering all picture elements to one of which neighboring correction data $E_b$ is added, within a second scanning window which has a size corresponding to M picture elements so as to scan said second image signal memory means, in accordance with one of ascending and descending orders of the image signal levels;
a rearrangement circuit means for assigning C as an image signal level to N picture elements of M picture elements in said first image signal memory means ordered by said preference circuit, A as an image signal level to a next picture element, and O as an image signal level to remaining picture elements;
a means for comparing an image signal level of rearranged picture element with a predetermined quantizing level V for $0 \leq V < C$, and for assigning C to the image signal level when the image signal level is greater than the quantizing level V as a binary image signal and assigning O to the image signal level when the image signal level is smaller than the quantizing level V as another binary image signal, and operating the error correction data $E_a$ from the difference of the image signal level and the assigned binary image signal;

a third memory means for storing preference correction data;

a first calculating means for calculating the neighboring correction data $E_b$ by the preference correction data neighboring the referred element corresponding to that in said first or second scanning window and, a second calculating means for calculating renewed preference correction data $E_c$ which are to be stored in an address corresponding to the referred picture element with the preference correction data read out from said third memory, image signal level of the referred picture element in said second image signal memory, and the binary image signal level.

BRIEF DESCRIPTION OF THE DRAWINGS

The present invention will now be described in further detail with reference to the accompanying drawings, in which.

DETAILED DESCRIPTION OF THE INVENTION

Through this specification and drawings, the size M of the scanning windows is fixed at 4. The picture element addresses in the first scanning window are denoted by the symbols $R_{00}$, $R_{01}$, $R_{10}$ and $R_{11}$. Similarly, the picture element addresses in the second scanning window are denoted by symbols $O_{00}$, $O_{01}$, $O_{10}$ and $O_{11}$. In the third memory, the referred address is denoted by the symbol $E_{c5}$, and the neighboring addresses are $E_{c1}$, $E_{c2}$, $E_{c3}$ and $E_{c4}$. The picture element addresses $R_{00}$, $O_{00}$ and the address $E_{c5}$ corresponded to the same picture element in referring. $R_{00}$, $R_{01}$, $R_{10}$ and $R_{11}$ define scanning window $W_r$, $O_{00}$, $O_{01}$, $O_{10}$ and $O_{11}$ define scanning window $W_o$, and $E_{c1}$, $E_{c2}$, $E_{c3}$, $E_{c4}$ and $E_{c5}$ define scanning window $W_e$ respectively. The scanning windows $W_r$, $W_o$ and $W_e$ are shifted right in synchronism with a main scan of scanner 1.

Figure 1:
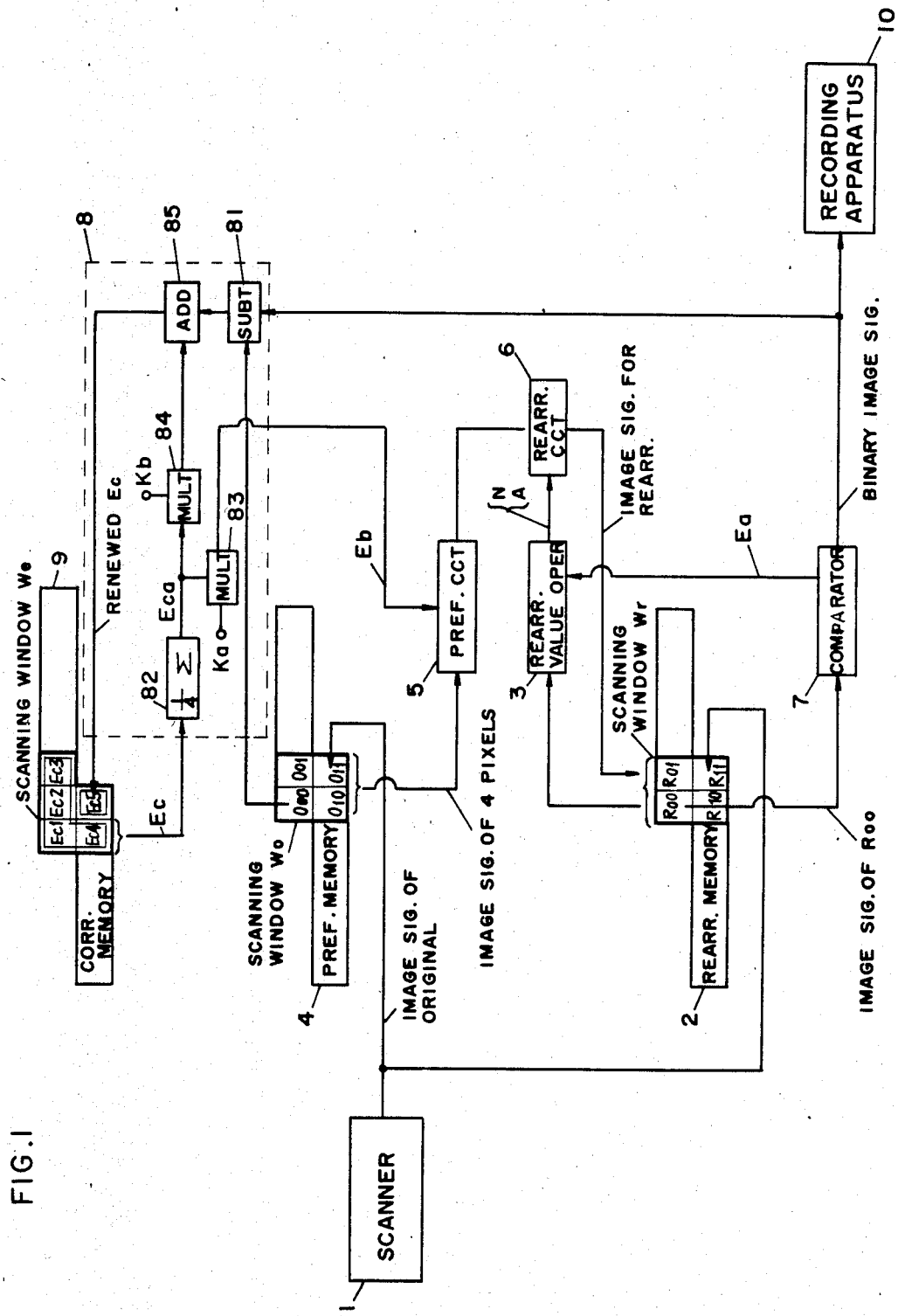
FIG. 1 is a block diagram of an image signal processing apparatus of the first embodiment of the present invention.

FIG. 1 illustrates the first embodiment of the present invention. In FIG. 1, numeral 1 denotes a scanner which scans an original and outputs an image signal as a digital signal. The scanner 1 is almost same as those disclosed in U.S. patent application Ser. No. 501,873 or British patent publication No. 2,129,652. The output signal from the scanner is supplied to a rearrangement memory 2 and a preference memory 4. The rearrangement memory 2 stores the output signal from the scanner 1 and output signal from a data rearrangement circuit 6 and outputs image signal levels of four picture elements $R_{00}$, $R_{01}$, $R_{10}$ and $R_{11}$ in the scanning window $W_r$. A rearrangement value operator 3 calculates a sum S of an error correction data $E_a$ from a comparator 7 and a sum $S_m$ of the image signal levels of four picture elements $R_{00}$, $R_{01}$, $R_{10}$ and $R_{11}$ from the rearrangement memory 2, and obtains N and A from the equation $S = C \times N + A$, where C is a predetermined image signal level, N is an integer falling in a range $0 \leq N \leq M$, and A is an image signal level falling in a range $0 \leq A \leq C$. The preference memory 4 receives an image signal of the original from the scanner and outputs image signal levels of four picture elements $O_{00}$, $O_{01}$, $O_{10}$ and $O_{11}$ in the scanning window $W_o$. The image signal levels from the preference memory 4 are supplied to a preference circuit 5 to which neighboring correction data $E_b$ is supplied from a multiplier 83. The preference circuit determines the preference order of the four picture elements by comparing image signal levels of the four picture elements, to a $O_{00}$ picture element of which neighboring correction data $E_b$ is added from a multiplier 83, in accordance with one of ascending and descending orders of the image signal levels. A data rearrangement circuit 6 receives data N and A from the preference value operator 3 and assigns C as an image signal level to N picture elements of four picture elements in the scanning window $W_r$ an order determined by the preference circuit 5, A as an image signal level to a next picture element, and O as an image signal level to the remaining picture element. Numeral 7 denotes a comparator which compares an image signal of rearranged picture element $R_{00}$ from the rearrangement memory 16 with a predetermined quantitizing level V, where $0 \leq V < C$, and outputs C as an image signal level to be recorded or displayed when the image signal $R_{00}$ is greater than the level V, and outputs O as an image signal level to be recorded or displayed when the image signal $R_{00}$ is smaller than the level V. At the same time, the comparator 7 outputs error correction data $E_a$ which is the difference between the image signal $R_{00}$ and the output signal of the comparator 7. Numeral 8 designates a preference correction means which receives an image signal level of the picture element $O_{00}$ from the preference memory 4, output image signal level of the comparator 7, and preference correction data $E_c$ from a correction data memory 9 and operates upon neighboring correction data $E_b$ and preference correction data $E_c$ so as to be renewed. The renewed correction data $E_c$ are stored in address $E_{c5}$ of the correction data memory 9. The output signal from the comparator 7 is supplied to a recording or display apparatus 10 to record or display a binary image. The apparatus 10 may be same as that disclosed in U.S. patent application Ser. No. 501,873.

The preference correction means 8 comprises a subtracter 81 for subtracting output a signal level of the comparator 7 from the image signal level of the picture element $O_{00}$ in the scanning window $W_o$, an average operator 82 for calculating an average $E_{ca}$ of four preference correction data $E_{c1}$, $E_{c2}$, $E_{c3}$ and $E_{c4}$ in the scanning window $W_e$, a first multiplier 83 for multiplying the average $E_{ca}$ by a predetermined coefficient $K_a$ to the average $E_{ca}$, a second multiplier 84 for multiplying the average $E_{ca}$ by a predetermined coefficient $K_b$, and an adder 85 for adding the output of the multiplier 84 and the output of the subtracter 81.

In FIG. 1, the constructions and operations of the scanner 1, the rearrangement memory 2, the rearrangement value operator 3, the preference memory 4, the preference circuit 5, the data rearrangement circuit 6, the comparator 7 and the recording or display apparatus 10 are substantially the same as those of U.S. patent application Ser. No. 501,873 or British patent publication No. 2,129,652.

Figure 2:
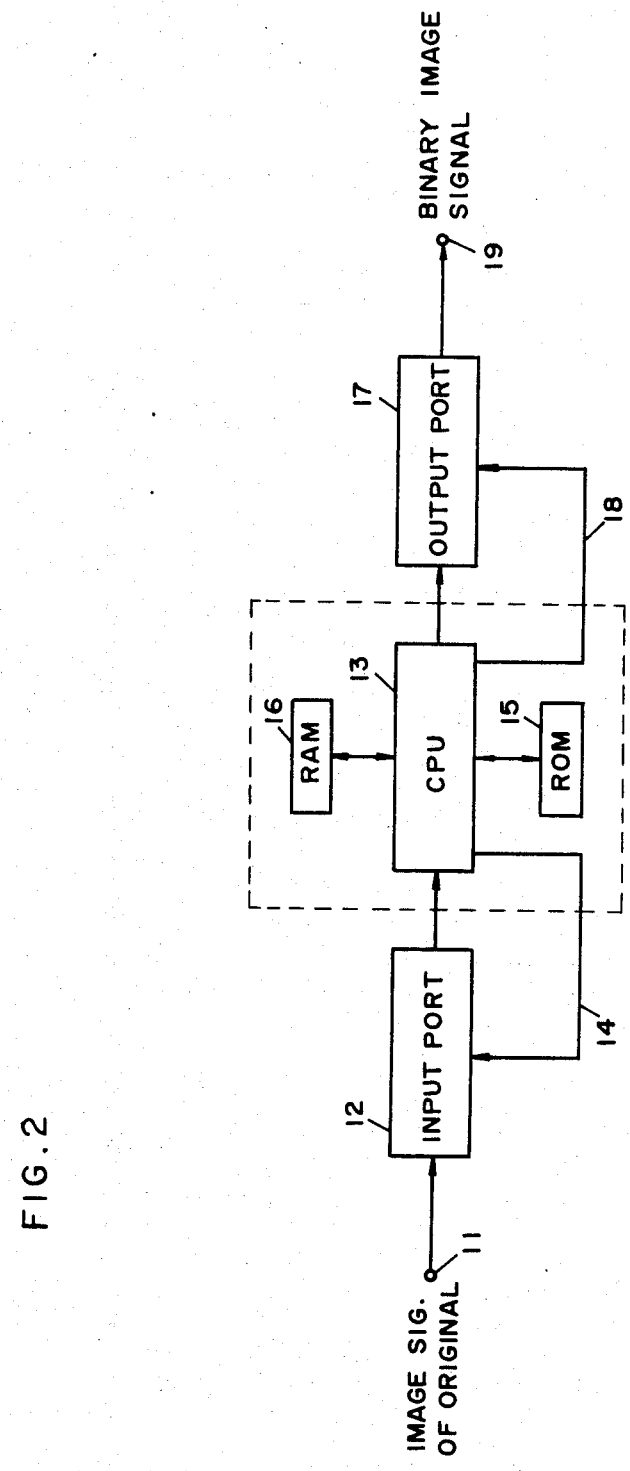
FIG. 2 is a block diagram of the preference circuit of FIG. 1.

FIG. 2 illustrates a block diagram which realizes the part including from the rearrangement memory 2 to the correction data memory 9 of FIG. 1 with a microcomputer. An image signal level of an original obtained from the scanner 1 is supplied to an input terminal 11. The input port 12 is a gate circuit which supplies an image signal level from the input terminal 11 to a CPU13 (central processing unit) in accordance with a selective signal fed from the CPU 13 through a signal line 14. An ROM 15 (read only memory) stores a program for controlling the CPU 13. In accordance with the program, the CPU takes in necessary data from the input port 12, performs predetermined operations by outputting and inputting data to a RAM 16 (random access memory), and supplies output data to an output port 17. The output port 17 is a latch circuit which stores data temporarily in accordance with a control signal fed from the CPU 13 through a signal line 18. The data stored in the output port 17 are output to an output terminal 19 as a binary image signal to be recorded or displayed.

The CPU 13, ROM 15 and RAM 16 can be constructed by any well known microcomputer.

Figure 3:
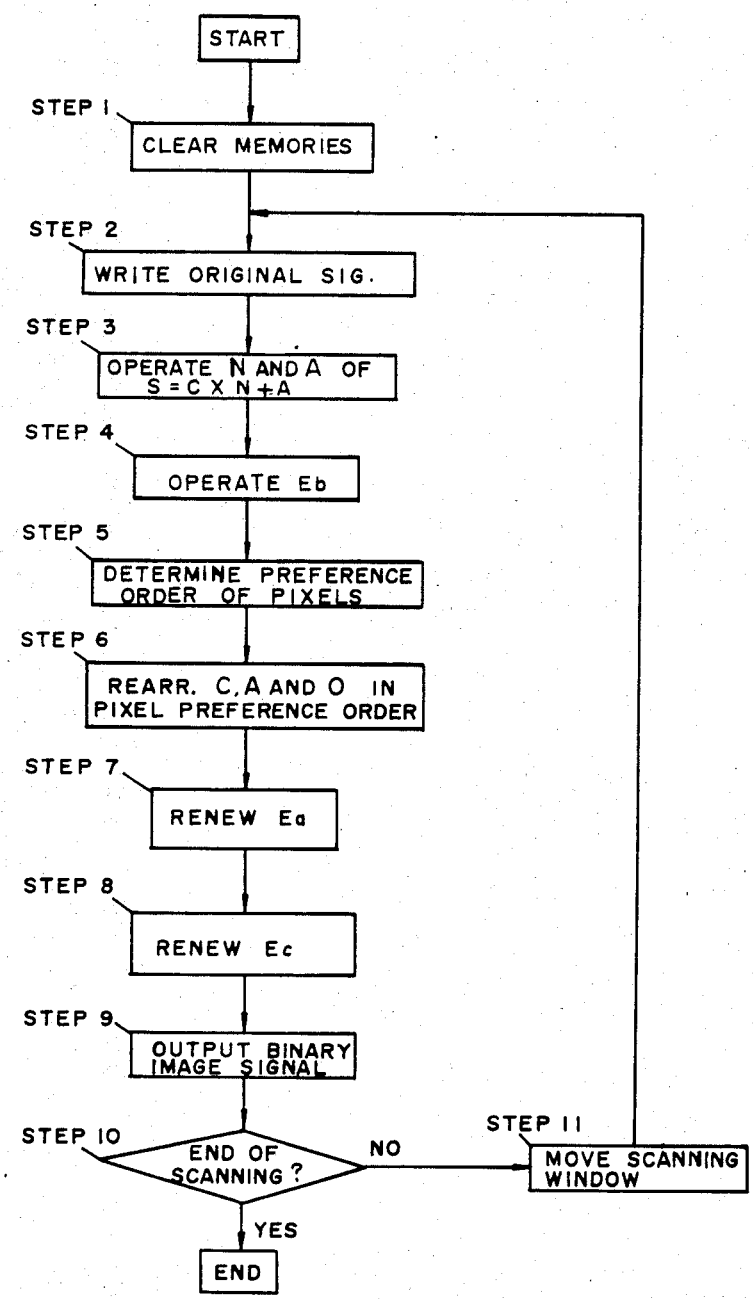
FIG. 3 is a flowchart for explaining the processing steps of the embodiment of FIG. 1.

FIG. 3 illustrates a flowchart corresponding to the program stored in the ROM 15.

When the program starts, the contents of the rearrangement memory 2, the preference memory 4 and the correction data memory 9 and error correction data $E_a$ are cleared (STEP 1). In STEP 2, the image signal of the original is written into the address of picture element $R_{11}$ of the rearrangement memory 2 and the address of picture element $O_{11}$ of the preference memory 4. In STEP 3, the rearrangement value operator 3 calculates a sum S of the error correction data $E_a$ and a sum $S_m$ of the image signal levels of picture elements $R_{00}$, $R_{01}$, $R_{10}$ and $R_{11}$ within the scanning window $W_r$ of the rearrangement memory 2, and operates integer N and remainder A from equation $S = C \times N + A$. In STEP 4, the average operator 82 calculates an average $E_{ca}$ of four preference correction data $E_{c1}$, $E_{c2}$, $E_{c3}$, and $E_{c4}$ within the scanning window $W_e$ of the correction data memory 9, and the average $E_{ca}$ is multiplied by the predetermined coefficient $K_a$ in the multiplier 83 to obtain neighboring correction data $E_b (= K_a \times E_{ca})$. The coefficient $K_a$ is, for example, $\frac{1}{2}^n$, where n is an integer. In STEP 5, the preference circuit 5 adds the neighboring correction data $E_b$ to the image signal level of the picture element $O_{00}$ within the scanning window $W_o$ of the preference memory 4, and determines the rearranging order of four picture elements $O_{00}$, $O_{01}$, $O_{10}$, and $O_{11}$ in descending order by comparing the image signal levels thereof. In STEP 6, the data rearrangement circuit 6 rearranges N predetermined image signal level C, the remainder A and O which are obtained in STEP 3, as image signals of four picture elements $R_{00}$, $R_{01}$, $R_{10}$ and $R_{11}$ within the scanning window $W_r$ of the rearrangement memory 2 according to the order obtained in STEP 5. In STEP 7, the comparator 7 converts the image signal of the rearranged picture element $R_{00}$ from the rearrangement memory 2 into a binary image signal with the quantitizing level V, and the difference between the image signal of the picture element $R_{00}$ and the converted binary signal is supplied to the rearrangement value operator 3 as a renewed error correction data $E_a$ for the next STEP 3. In STEP 8, the preference correction means 8 calculates the product of the coefficient $K_b$ and the average $E_{ca}$ obtained in STEP 4 by the multiplier 84, and adds the product to the difference between the image signal level of the picture element $O_{00}$ in the scanning window $W_o$ and the binary image signal level from the comparator 7, which is calculated by the subtracter 81, in the adder 85 to produce renewed preference correction data $E_c$ which is to be stored in the picture element $E_{c5}$ within the scanning window $W_e$ of the correction data memory 9. In STEP 9, the binary image signal from the comparator 7 is supplied to the display apparatus 10. In STEP 10, a determination is made as to whether the above processes are ended relating to all of the image signals of the original in both the main and sub scans. If the processes are not ended, the scanning windows $W_o$, $W_r$ and $W_e$ are moved and STEP 2 to STEP 10 are repeated. In this case, the error correction data $E_a$ is cleared at the end of every main scan in STEP 11.

When the coefficient $K_a$ is $\frac{1}{2}^n$ and $K_b$ is $114 \frac{1}{2}^m$, where n and m are positive integers, the operations in the microcomputer become easy.

The microcomputer may be replaced by logic circuits and memories. In this case, the hardware can be simplified by using the above valued coefficients $K_a$ and $K_b$.

Figure 4:
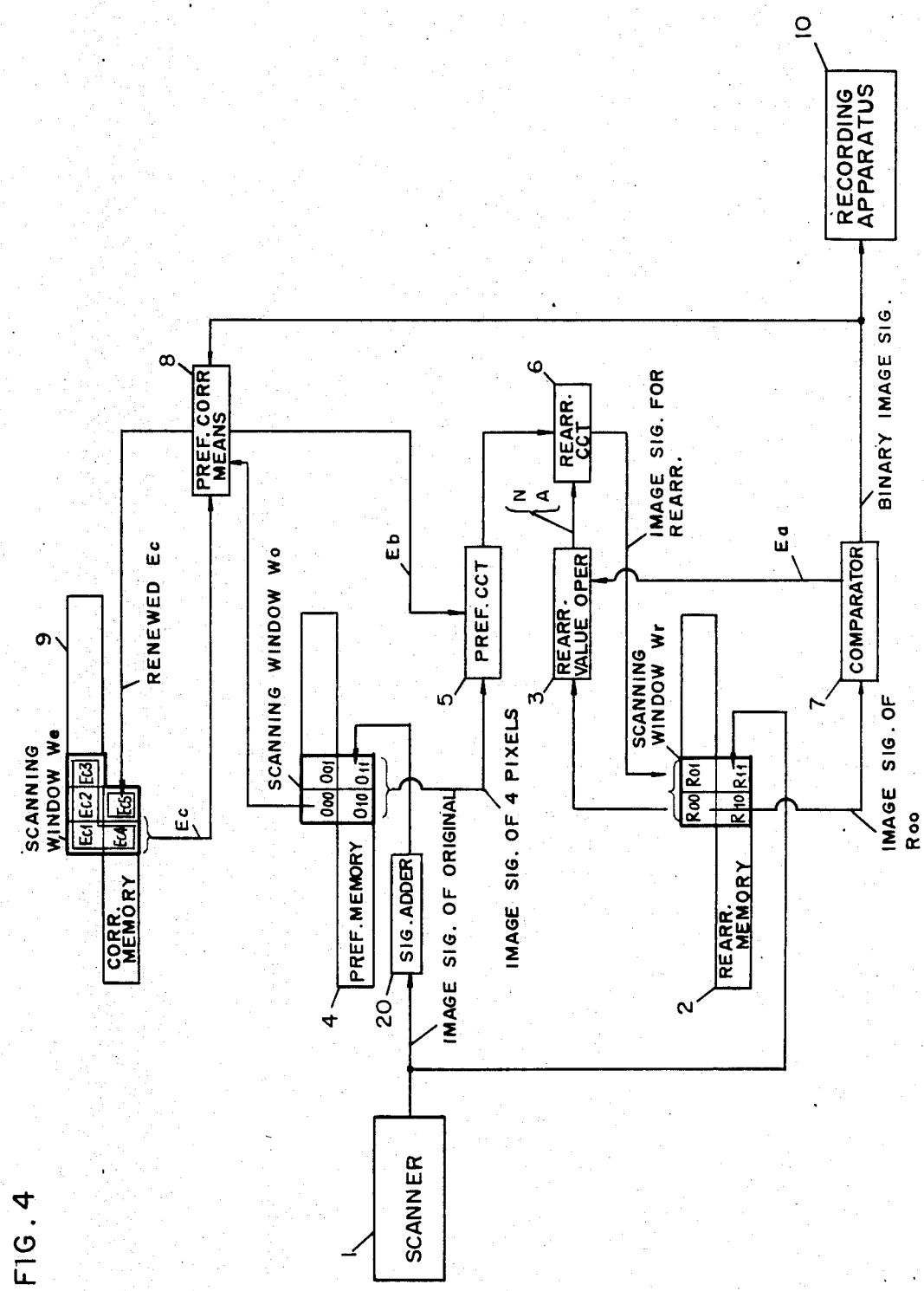
FIG. 4 is a block diagram of an image signal processing apparatus of the second embodiment of the present invention.
Figure 5:
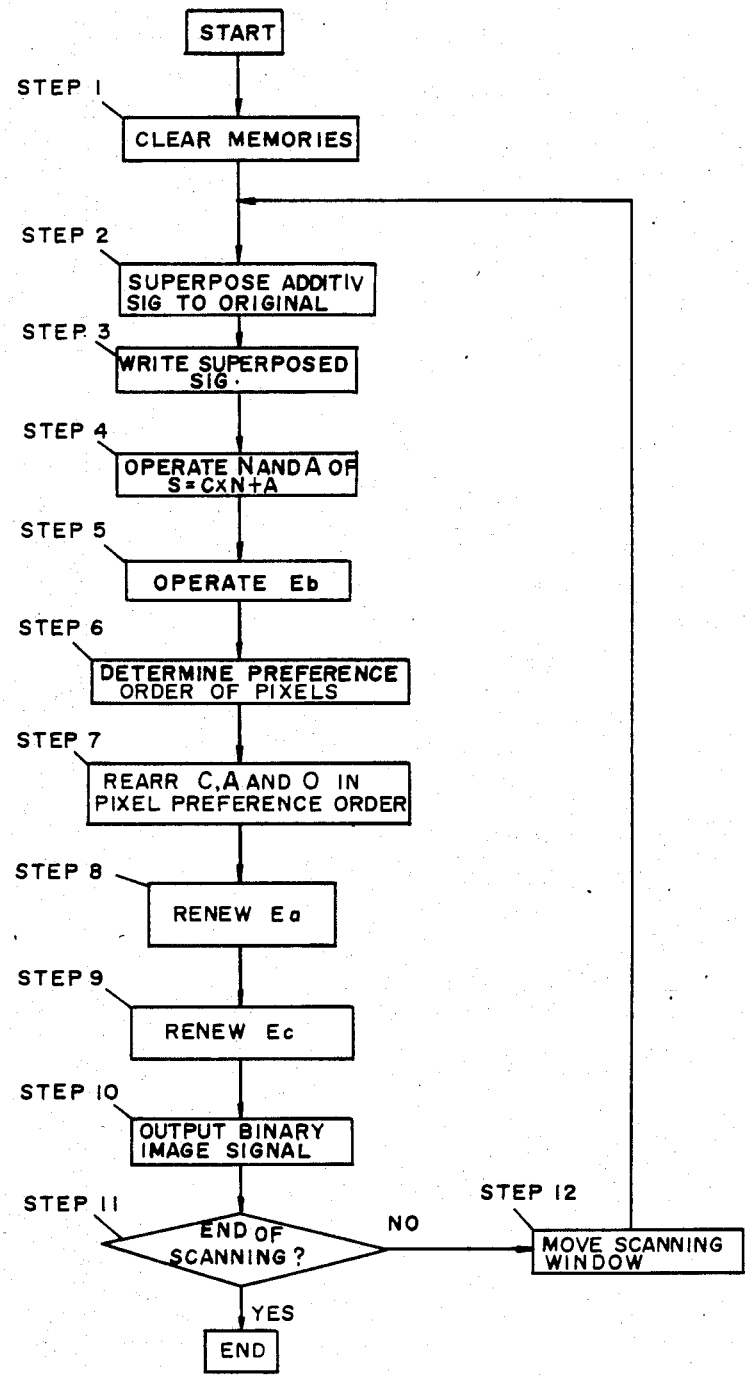
FIG. 5 is a flowchart for explaining the processing steps of the embodiment of FIG. 4.

FIG. 4 illustrates another embodiment of the present invention. In FIG. 4 a signal adder 20 is provided between the canner 1 and the preference memory 4. The signal adder 20 adds a periodic signal which is in synchronism with the picture elements of the original image and having a different signal level to the original image signal from the scanner 1. The signal adder 20 is substantially the same as that shown in British patent publication 2,129,652. Other portions of FIG. 4 are the same as those of FIG. 1. In this embodiment, the periodic signal is superposed on the original image signal as STEP 2 shown in FIG. 5. The remaining steps are the same as those in FIG. 3. The embodiment improves the visual characteristics of the reproduced image with diverging error data in the additive signal. When a random signal is superposed as the additive signal, the improvement of the moire signal or the reproduction of an image having special effects are obtained.

Figure 6:
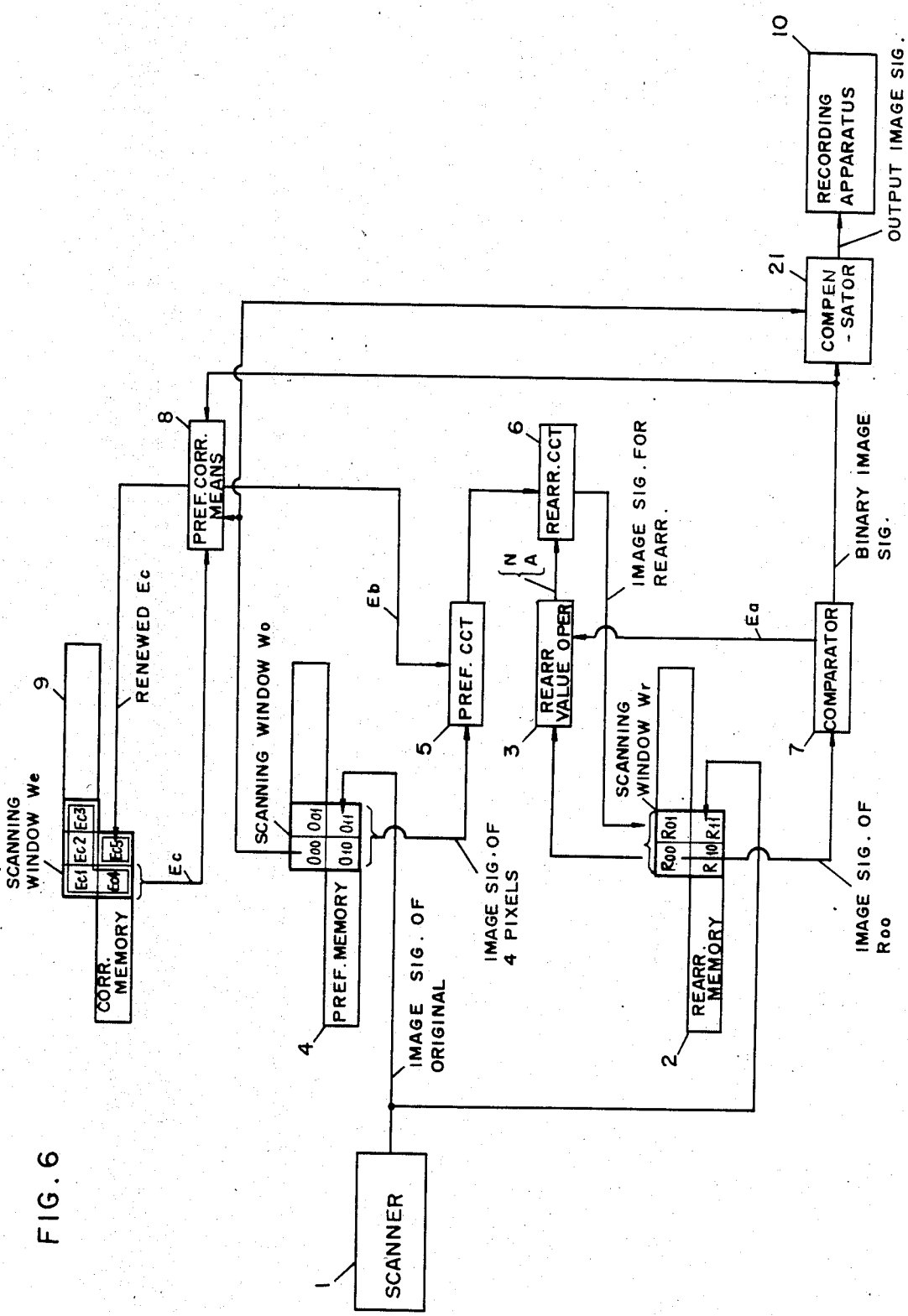
FIG. 6 is a block diagram of an image signal processing apparatus of the third embodiment of the present invention.

FIG. 6 illustrates a third embodiment of the present invention. A compensator 21 is provided between the comparator 7 and the recording or display apparatus 10. The compensator 21 selects the binary image signal from the comparator 7 in accordance with the image signal level of the picture element $O_{00}$ within the scanning window $W_o$ of the preference memory 4. Other portions of FIG. 6 are same as those of FIG. 1.

Figure 7:
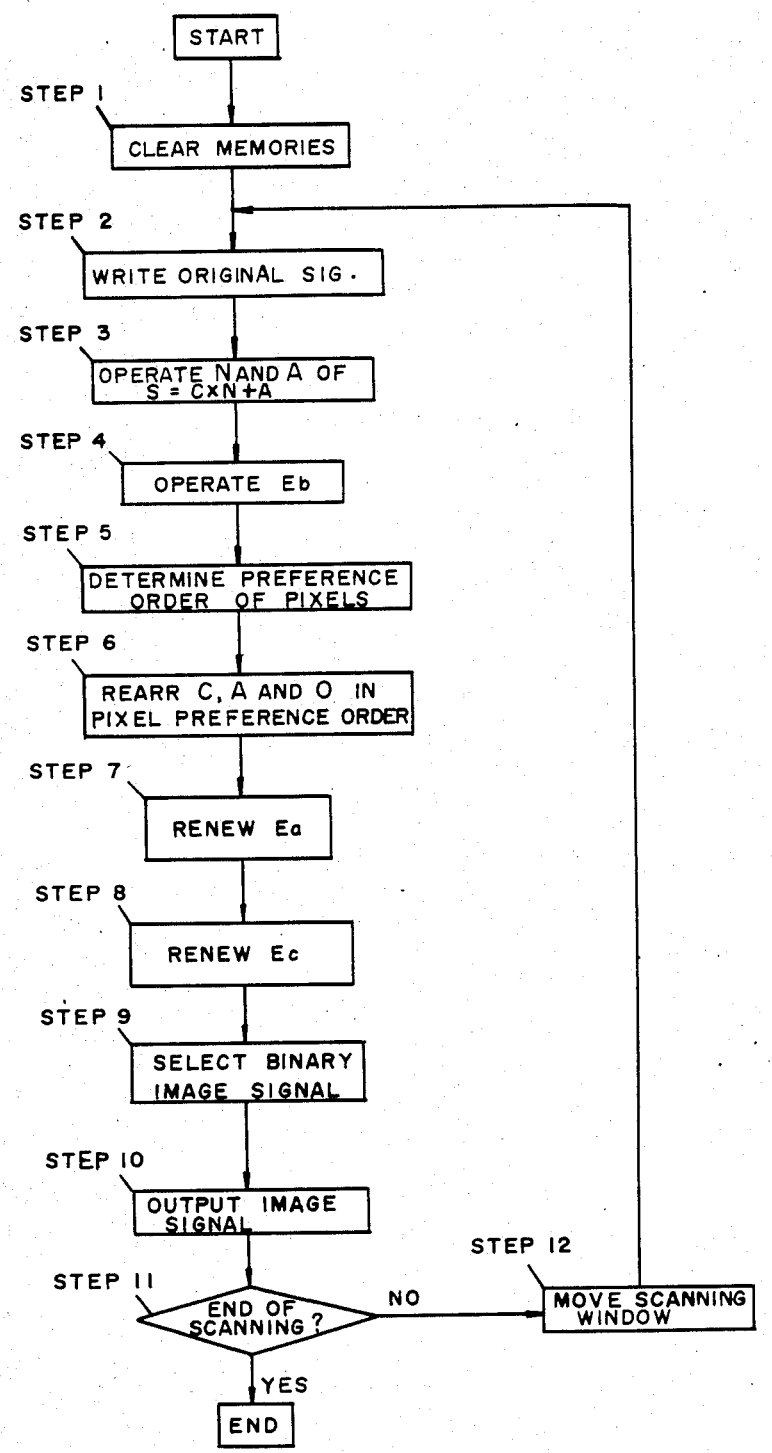
FIG. 7 is a flowchart for explaining the processing steps of the embodiment of FIG. 6.

In the operation shown in FIG. 7, STEP 9 is newly added after renewing $E_c$ in STEP 8, which corresponds to STEP 8 of FIG. 3. In STEP 9 of FIG. 7, the compensator 21 compares the image signal level of the picture element $O_{00}$ in the scanning window $W_o$ of the preference memory 4 with a predetermined low level value T1 and a high level value Th, and selects an output signal level as shown below.
(1) Output O when $O_{00} \leq T1$;
(2) Output C when $O_{00} \geq Th$;
(3) Output the binary image signal from the comparator 7 when $T1 < O_{00} < Th$;
where $O_{00}$ is the image signal level of the picture element $O_{00}$, and C is a predetermined recording level, which usually corresponds to a maximum recording level. The embodiment suppresses noise contained in high and low level of the binary image signal.

Figure 8:
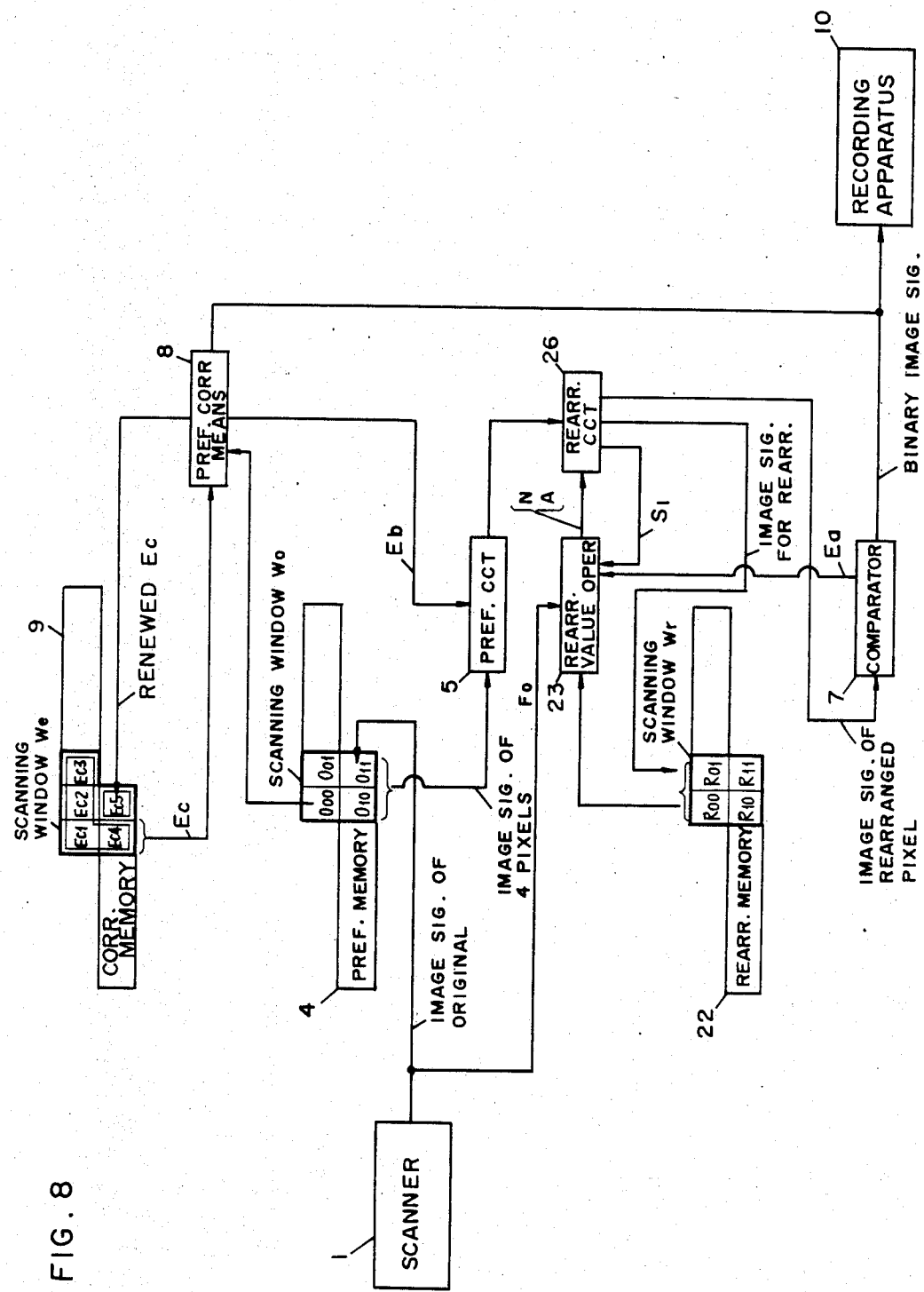
FIG. 8 is a block diagram of an image signal processing apparatus of the fourth embodiment of the present invention.

FIG. 8 illustrates a fourth embodiment of the present invention. In FIG. 8, the constructions and/or connections of the rearrangement memory 22, the rearrangement value operator 23 and the data rearrangement circuit 26 are different from those of FIG. 1. The other portions are the same as those of FIG. 1. The rearrangement memory 22 receives a rearrangement image signal level from the data rearrangement circuit 26, and stores an upper U bit of the rearrangement image signal level in three picture elements $R_{00}$, $R_{01}$, and $R_{10}$ within the scanning window $W_r$, and supplies the stored upper U bit signal to the rearrangement value operator 23. The rearrangement value operator 23 calculates a sum S of a value Su which is obtained by inserting O in each of the lower L bits of a sum of the three image signal levels of the picture elements $R_{00}$, $R_{01}$, and $R_{10}$ from the rearrangement memory 22, error correction data $E_a$ from the comparator 7, image signal level $F_o$ of the original from the scanner 1, and rearrangement correction data S, from the data rearrangement circuit 26, and obtains N and A from $S = C \times N + A$ similarly to the case of FIG. 1. The data rearrangement circuit 26 comprises a means for determining the arrangement of C for N picture elements, A and O for the remaining picture elements in accordance with the preference order designated by the preference circuit 5, a means for storing upper U bit data of the image signal levels for rearrangement into three picture elements $R_{01}$, $R_{10}$, and $R_{11}$ within the scanning window $W_r$ of the rearrangement memory 22, a means for obtaining the renewed rearrangement correction data $S_1$ by summing the lower L bits data of the image signal levels for rearrangement and a means for supplying all bit data of the image signal levels corresponding to the picture element $R_{00}$ within the scanning window $W_r$ of the rearrangement memory 22 to the comparator 7.

Figure 9:
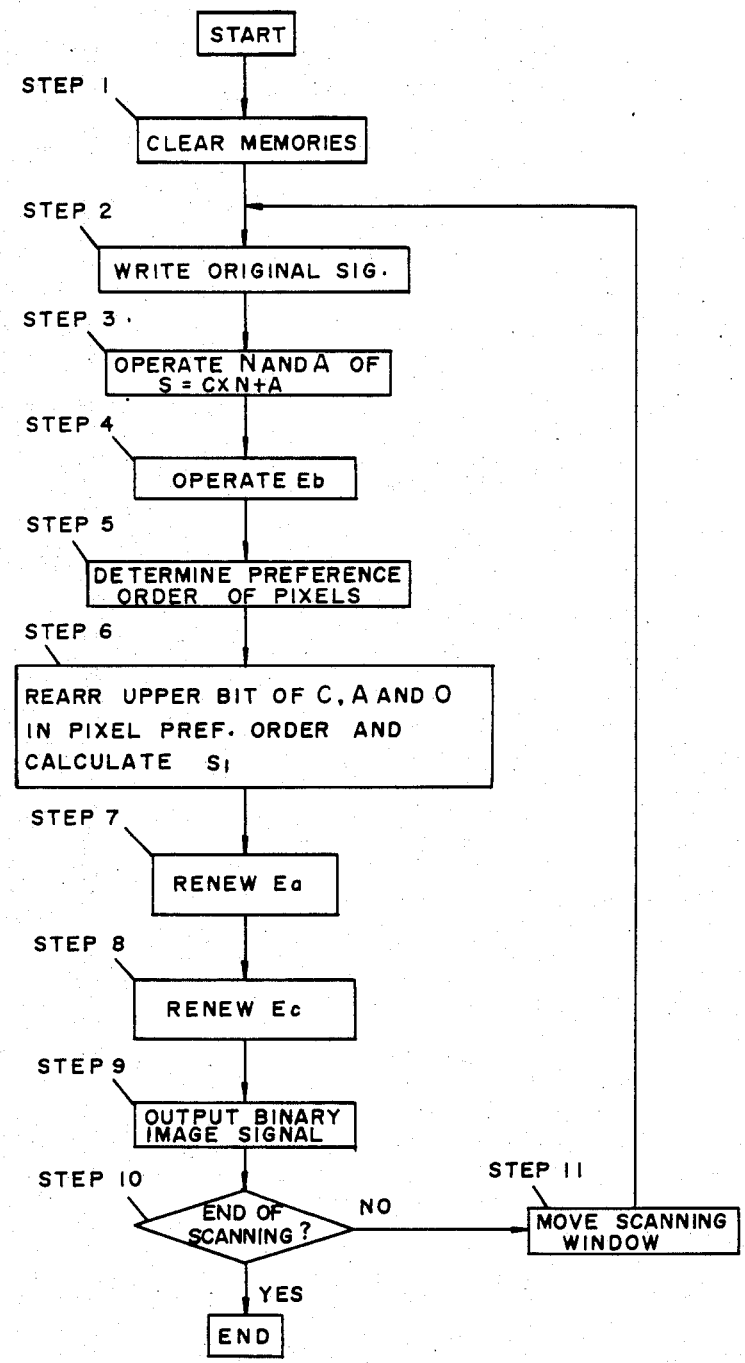
FIG. 9 is a flowchart for explaining the processing steps of the embodiment of FIG. 8.

FIG. 9 illustrates a flowchart for explaining operations of the block diagram of FIG. 8.

When the program starts, the contents of the rearrangement memory 22, the preference memory 4 and the correction data memory 9, and error correction data $E_a$ and rearrangement correction data $S_1$ are cleared (STEP 1). In STEP 2, the image signal level $F_o$ of the original is written in the rearrangement value operator 23 and the address of picture element $O_{11}$ within the scanning window $W_o$ of the preference memory 4. In STEP 3, the rearrangement value operator 23 calculates the sum S ($= Su + Ea + S_1 + F_o$) and operates integer N and remainder A from equation $S = C \times N + A$. STEP 4 and STEP 5 are similar to those of FIG. 3. In STEP 6, the upper U bit data of the image signal levels for rearrangement C, A and O into three picture elements $R_{01}$, $R_{10}$ and $R_{11}$ within the scanning window $W_r$ of the rearrangement memory 22 in accordance with the preference order obtained in STEP 5, the sum of lower L bits data of the image signal levels in the three picture elements $R_{01}$, $R_{10}$, $R_{11}$, within the scanning window $W_r$ is supplied to the rearrangement value operator 23 as renewed rearrangement correction data $S_1$ and all bit data of the image signal levels of the rearranged picture element $R_{00}$ are supplied to the comparator 7. These are performed by the data rearrangement circuit 26. STEP 7 to STEP 11 are similar to those of FIG. 3. The embodiment reduces the amount of buffer memory used as the rearrangement memory 22 from U+L bits to U bits.

Figure 10:
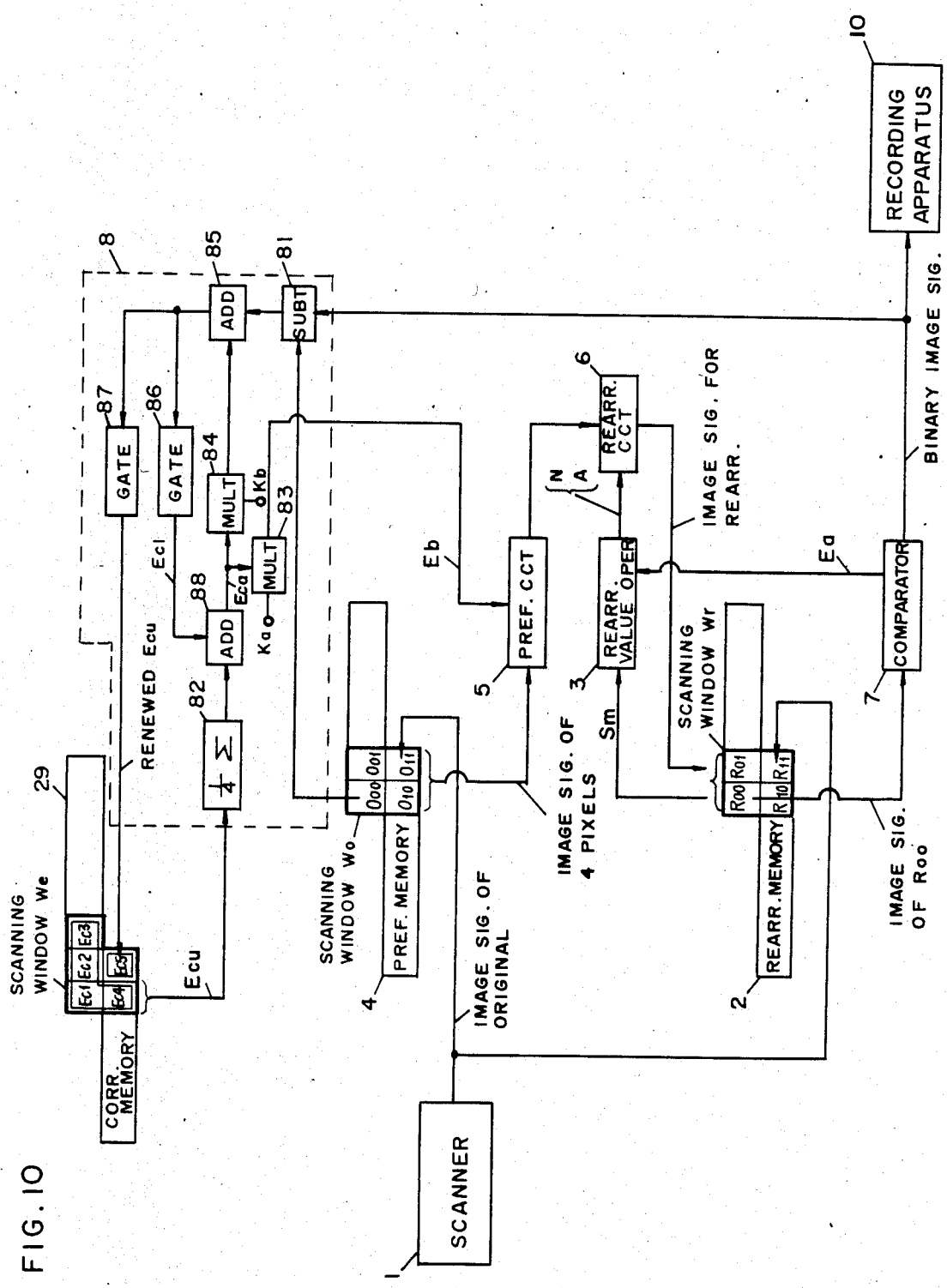
FIG. 10 is a block diagram of an image signal processing apparatus of the fifth embodiment of the present invention.

FIG. 10 illustrates a fifth embodiment of the present invention. The correction data memory 29 is smaller in bit number (U bit) than that (U+L bit) of the correction data memory 9 of FIG. 1. To compensate for this, a lower bit gate 86, an upper bit gate 87 and an adder 88 are provided in the preference correction means 8. Other portions are same as those of FIG. 1.

Figure 11:
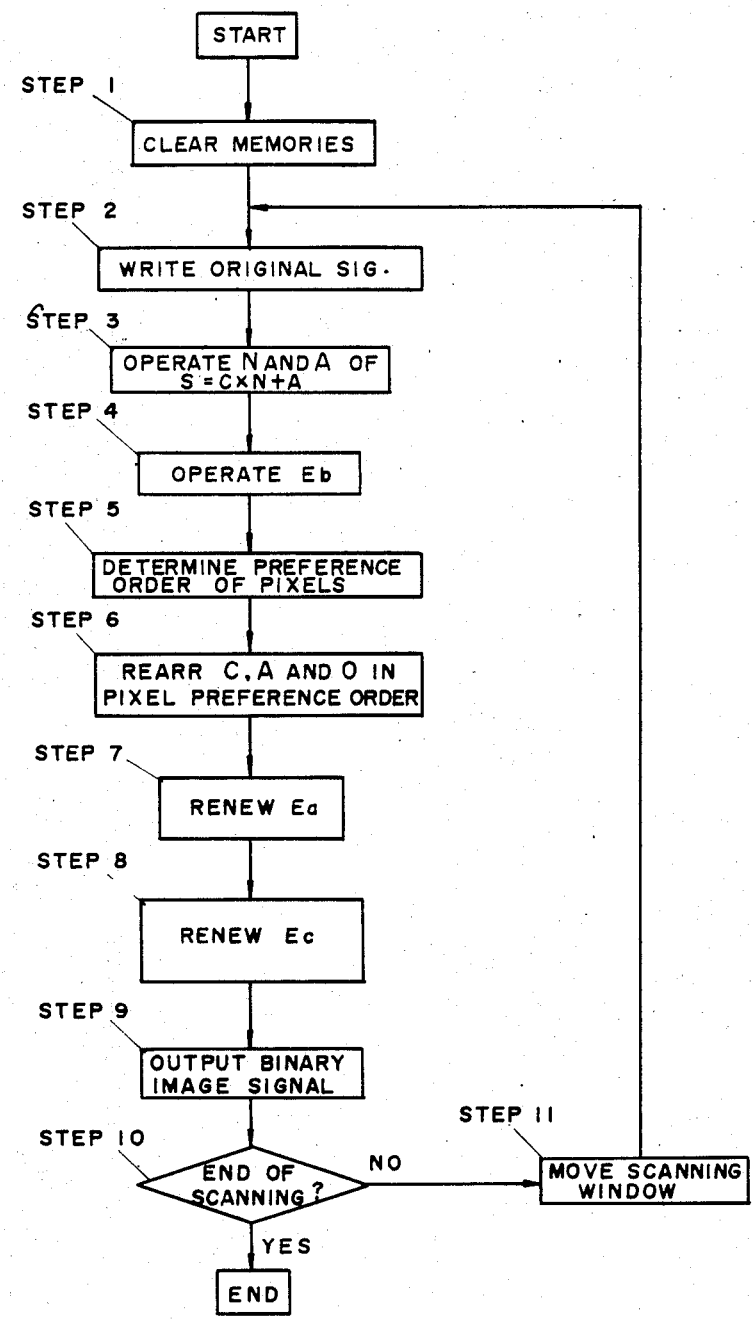
FIG. 11 is a flowchart for explaining the processing steps of the embodiment of FIG. 10.

FIG. 11 illustrates a flowchart for explaining operations of the block diagram of FIG. 10.

When the program starts, the contents of the rearrangement memory 2, the preference memory 4 and the correction data memory 9, and error correction data $E_a$, preference correction data $E_{ca}$ from the adder 88, upper bit preference correction data $E_{cu}$ from the gate 87, and lower bit preference correction data $E_{CL}$ are cleared (STEP 1). STEP 2 and STEP 3 are same as those of FIG. 3. In STEP 4, the average operator 82 calculates average of four preference correction data which are formed with four upper bit preference correction data $E_{CU}$ having U bits from addresses $E_{c1}$, $E_{c2}$, $E_{c3}$ and $E_{c4}$ within the scanning window $W_e$ of the correction data memory and O inserted in the lower L bit thereof, and the adder 88 adds the average from the average operator 82 and the lower bit preference correction data $E_{CL}$ selected by the gate 86 and delayed in time corresponding to one picture element. The thus obtained sum $E_{ca}$ is multiplied by a coefficient $K_a$ with the multiplier 83 to obtain neighboring correction data $E_b (=K_a \times E_{ca})$. Step 5, 6 and 7 are same as those of FIG. 3. In STEP 8, the multiplier 84 calculates the product of the coefficient $K_b$ and the average $E_{ca}$ obtained in STEP 4 and adds the product to the difference between the image signal level of the picture element $O_{00}$ in the scanning window $W_o$ and the binary image signal level from the comparator 7, which is calculated by the subtracter 81, in the adder 85 to produce renewed upper bit preference correction data $E_{cu}$ and lower bit preference correction data $E_{CL}$. The renewed upper bit preference correction data $E_{CU}$ is stored in an address corresponding to the picture element $E_{c5}$ in the scanning window $W_e$ through the gate 87. STEP 9, 10 and 11 are same as those of FIG. 3. In this case, the error correction data $E_a$, the preference correction data $E_{ca}$, the upper bit preference correction data $E_{CU}$ and lower bit preference correction data $E_{CL}$ are cleared at the end of every main scan in STEP 11.

In this embodiment, the preference correction data $E_{ca}$ may be replaced with the average of the upper bit preference correction data $E_{CU}$ as the upper bits and the average of the lower bit preference correction data $E_{CL}$ as the lower bits.

The embodiment has the advantages of reducing the amount of buffer memory used as the correction data memory 29 from U+L bits to U bits.

Figure 12:
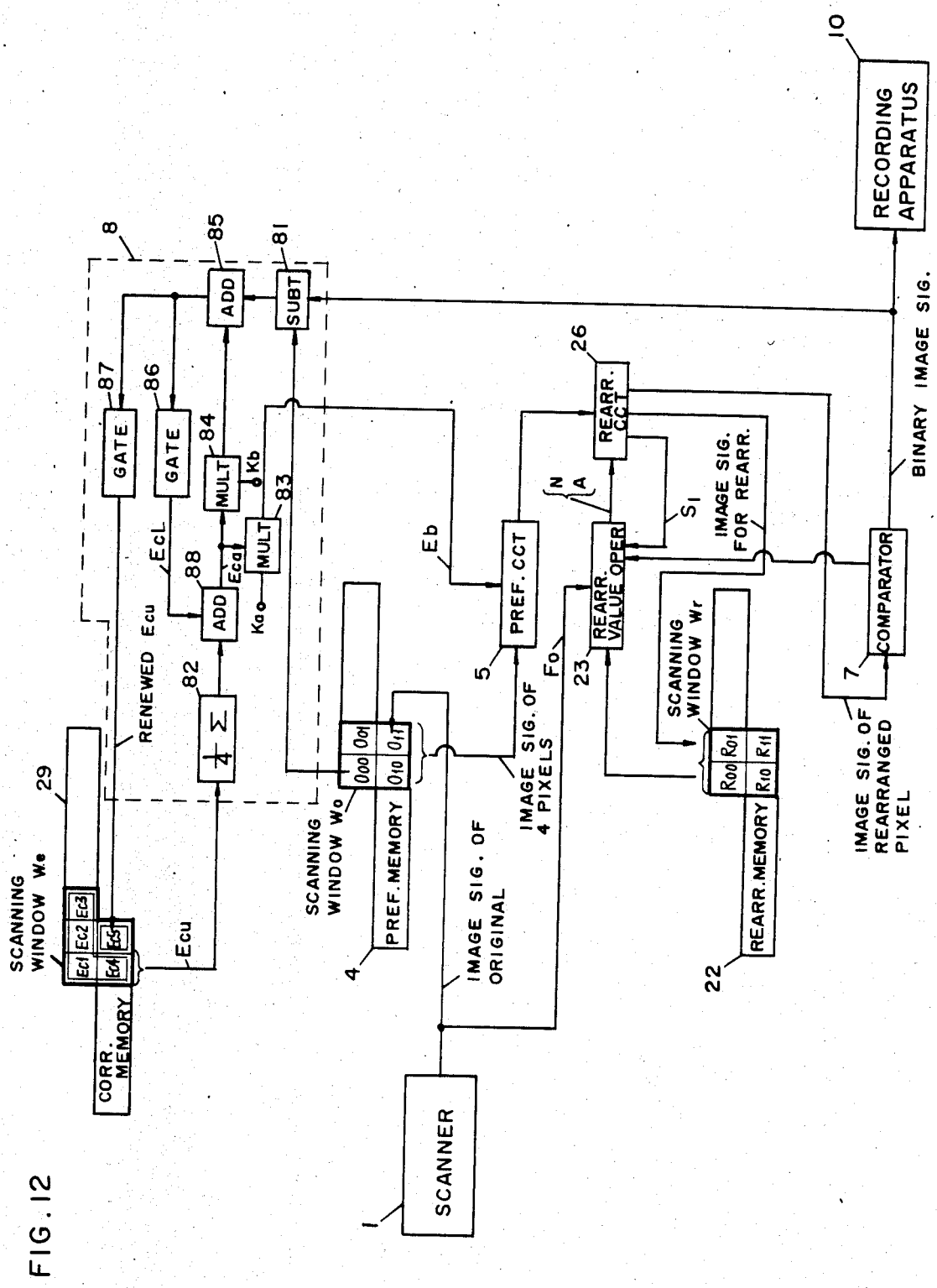
FIG. 12 is a block diagram of an image signal processing apparatus of the sixth embodiment of the present invention.
Figure 13:
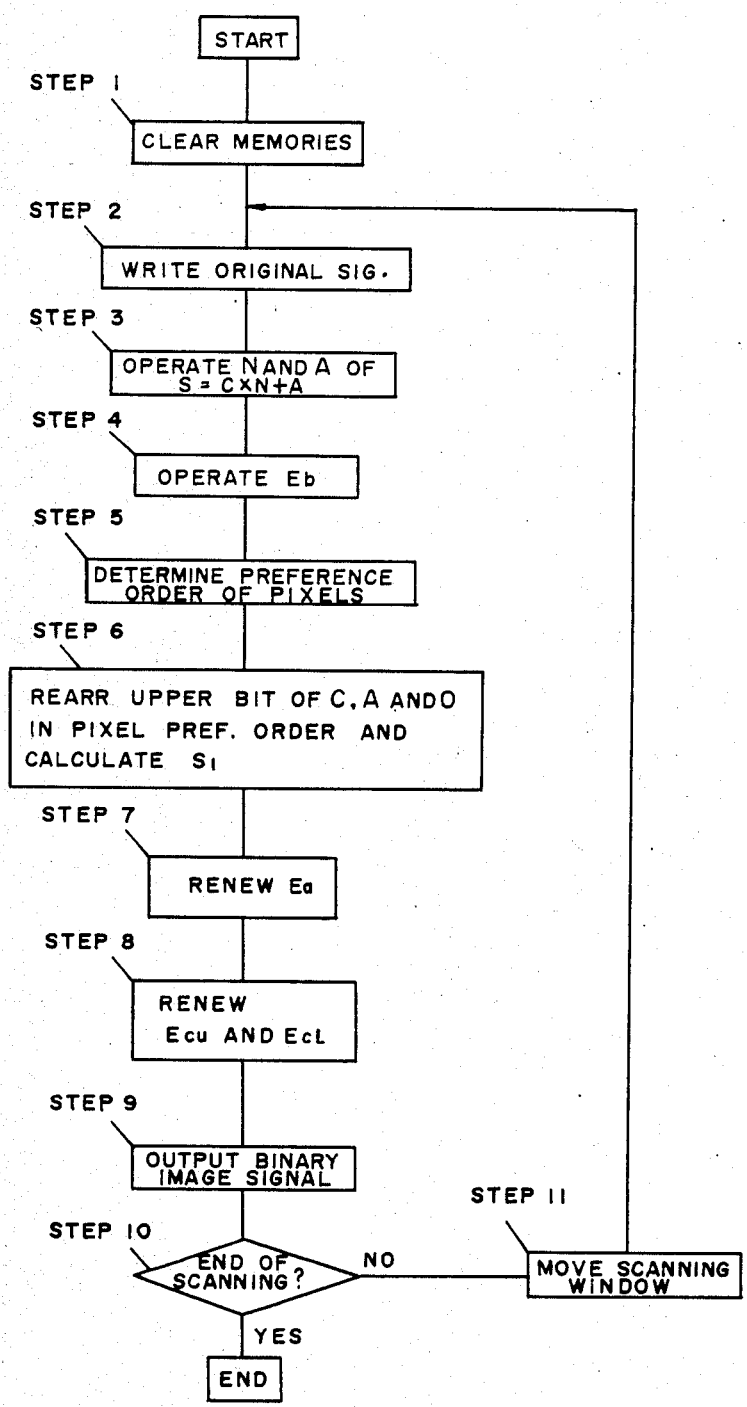
FIG. 13 is a flowchart for explaining the processing steps of the embodiment of FIG. 12.

FIG. 12 illustrates a sixth embodiment of the present invention. The embodiment combines the embodiments of FIG. 8 and FIG. 10, and each of the components is the same as those of FIG. 8 or FIG. 10 having the same reference numeral. The operation is performed as illustrated in FIG. 13, which is the combination of FIG. 9 and FIG. 11. Therefore a detailed explanation is not repeated.

Figure 14:
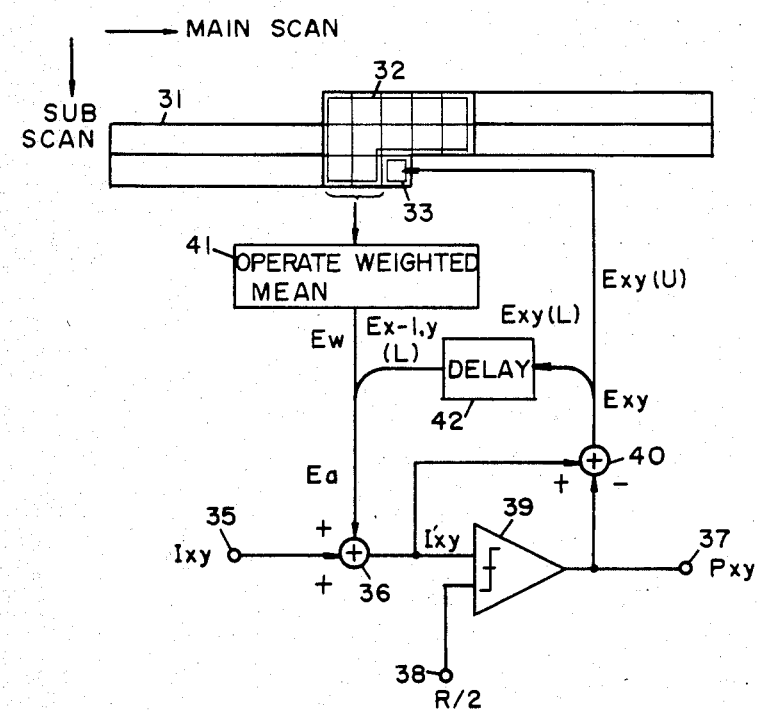
FIG. 14 is a block diagram of an image signal processing apparatus of the seventh embodiment of the present invention.

FIG. 14 illustrates a seventh embodiment of the present invention. An error data memory 31 and an error matrix 32 are same as the correction data memory 29 and the scanning window $W_e$ of FIG. 10. Numeral 33 denotes a memory location in which an error $E_{xy}$ at co-ordinates xy of the original image is stored. An original image data $I_{xy}$ from the co-ordinates xy of the original image is supplied to input terminal 35. An adder 36 calculates a sum I'xy of the original image data Ixy and a mean error $E_a$. A comparator 39 compares the signal I'xy with a predetermined value R/2 from a terminal 38 to obtain binary data Pxy=R when I'xy>R/2, and Pxy=O when I'xy≦R/2. The output Pxy from the comparator 39 is supplied to an output terminal 37. A subtracter 40 calculates the error Exy by subtracting the binary data Pxy from the signal I'xy. A weighted mean calculating means 41 calculates a weighted mean of error data stored in the error matrix 32 of the error data memory 31. Numeral 42 denotes a delay circuit.

The error data memory 31, the error matrix 32 and the weighted mean calculating means 41 correspond to the correction data memory 2P, the scanning window $W_e$ and the average operator 82 of FIG. 10 respectively.

The weighted mean calculating means 41 calculates a weighted mean $E_w$ of the data within the error matrix 32 by the following equation:

$$E_w = \frac{1}{\sum_{ij} a_{ij}} \sum_{ij} a_{ij} E_{x+i, y+i}$$

where, i and j are coordinates in error matrix 32, and $A_{ij}$ is a matrix coefficient which gives weights of distances from the coordinates xy of the referred picture element to the error. For example, $A_{ij}$ is represented by:

$$A_{ij} = \begin{pmatrix} 1 & 3 & 5 & 3 & 1 \\ 3 & 5 & 7 & 5 & 3 \\ 5 & 7 & * & & \end{pmatrix}$$

where * is a location of the referred picture element. The mean error $E_a$ consists of upper bits formed with the weighted mean $E_w$ and lower bits formed with a lower L bits data $E_{x-1,y}(L)$ of the error $E_{x-1,y}$ which is obtained by delaying the error Exy from the subtractor 40 in the delay circuit 42. The adder 36 adds the mean error Ea and the original image data Ixy to obtain output I'xy (=Ixy+Ea). The comparator 39 compares the output I'xy of the adder 36 and the predetermined value R/2, and supplies the binary signal Pxy to the output terminal 37. The subtracter 40 calculates difference Exy of the output I'xy of the adder 36 and the binary signal Pxy, and the upper U bit Exy(U) of the difference Exy is supplied to the error data memory 31 as a renewed error for the coordinate xy of the original image. The renewed error data Exy(U) is stored in the memory location 33 of the error data memory 31. On the other hand, the lower L bit Exy(L) of the difference Exy is supplied to the delay circuit 42. The delay circuit 42 replaces the data $E_{x-1,y}(L)$ before one picture element with the data Exy(L) and holds the same.

In calculating the mean error Ea, it is possible to add the output of the delay circuit 42 to a weighted mean which is obtained by calculating the same using the data consisted of upper U bit error data in the error matrix 32 and 0 added to lower L bits thereof. The method improves precision of calculating the weighted mean. Furthermore, the delay circuit 42 can be omitted by adjusting the subtractor 40 in holding previously subtracted results until the adder 36 receives the mean error Ea.

In experimental results, no deterioration of the reproduced image is observed by deleting the lower 5 bit data from 8 bit data of the output Exy of the subtractor 40. On the contrary, a texture of a stripe pattern which is inherent to a conventional mean error minimizing method is removed by deleting the lower bit data. According to the embodiment of FIG. 14, the memory capacity of the error data memory 31 can be reduced L bits per one picture element without deteriorating the halftone reproducing characteristics.

What is claimed is:

1. An apparatus for processing image signal comprising;
   first and second image signal memory means for storing image signal levels of picture elements which are obtained by scanning an original image in a divided manner;
   means for calculating a sum S of error correction data $E_a$ and a sum $S_m$ of the image signal levels of all picture elements within a first scanning window which has a size corresponding to M picture elements and which scans said first image signal memory means, and obtaining N and A from equation $S = C \times N + A$ where C is a predetermined image signal level, N is an integer falling in a range O=N≦M, and A is an image signal level falling in a range O≦A<C;
   preference circuit means for numbering all picture elements to one of which neighboured correction data $E_b$ is added, within a second scanning window which has a size corresponding to M picture elements so as to scan said second image signal memory means, in accordance with one of ascending and descending orders of the image signal levels;
   rearrangement circuit means for assigning C as an image signal level to N picture elements of M picture elements in said first image signal memory means ordered by said preference circuit, A as an image signal level to a next picture element, and O as an image signal level to remaining picture elements,
   means for comparing an image signal level of rearranged picture element with a predetermined quantizing level V for O≦V<C, and for assigning C to the image signal level when the image signal level is greater than the quantizing level V as a binary image signal and assigning O to the image signal level when the image signal level is smaller than the quantizing level V as another binary image signal, and oprating the error correction data $E_a$ from the difference of the image signal level and the assigned binary image signal,
   third memory means for storing preference correction data,
   a first calculating means for calculating the neiboured correction data $E_b$ by the preference correction data neiboured to the refered picture element corresponding to that in said first or second scanning window and, a second calculating means for calculating renewed preference correction data which are to be stored into add ress corresponding to the referred picture element with the preference correction data read out from said third memory, image signal level of the referred picture element in said second image signal memory and the binary image signal level.

2. An apparatus as claimed in claim 1, wherein said neighboured correction data $E_b$ is calculated by multipying a coefficient $\frac{1}{2}^n$ to a mean value of the preference correction data neighboured to the refered picture element, where n is an positive integer.

3. An apparatus as claimed in claim 1, wherein said renewed preference correction data is calculated by adding a product of a coefficient $1\frac{1}{2}^m$ and a mean value of the preference correction data neighboring to the referred picture element to a difference between said image signal level of the refered picture element in said second image signal memory and the binary image signal level, where m is an positive integer.

4. An apparatus as claimed in claim 1, further comprising an additive means for superposing to upon the image signal obtained by scanning the original image a signal having different signal level from said image signal.

5. An apparatus as claimed in claim 4, wherein said superposing signal is a periodic signal in synchronism with the picture element of said image signal.

6. An apparatus as claimed in claim 1, further comprising a selecting an means for selecting output to be recorded and/or displayed, said selecting means comprising a comparator for comparing the image signal level of referred picture element with predetermined high and low reference levels, and a selector for selecting out a binary signal level or an output from said comparing means in accordance with the result obtained by said comparator.

7. An apparatus as claimed in claim 1, whrein said preference correction data neighboring to the referred picture element consists of upper U bit preference correction data and lower L bit preference correction data, and said third memory means stores said upper U bit preference correction data.

8. An apparatus as claimed in claim 1, wherein means are provided for operating upon preference correction data, said means calculating a mean value of data consisting of the upper U bit preference correction data and O inserted into a lower L bit, and adding the lower L bit preference correction data thereto.

9. An apparatus as claimed in claim 1, wherein means are provided for operating upon preference correction data, said means calculates a mean value of the upper U bit preference correction data as an upper bit and adds the lower L bit preference correction data thereto as a lower bit.

10. An apparatus for processing image signal comprising;

first image signal memory means for storing upper U bits data fo U+L bits image signal levels of picture elements which are obtained by scanning an original image in a divided manner;

second image signal memory means for storing U+L bits image signal levels of picture elements which are obtained by scanning an original image in a divided manner;

means for calculating a sum S of error correction data $E_a$, valve Su consisting of a sum of the upper U bits data of M-1 picture elements within a first scanning window which has a size corresponding to M picture elements and which scans said first image signal memory means and O added to lower L bits, a rearrangement correction data S1 and image signal level of the original image, and obtaining N and A from equation $$S = C \times N + A$$

where C is a predetermined image signal level, N is an integer falling in a range $O \leq N \leq M$, and A is an image signal level falling in a range $O \leq A < C$;

preference circuit means for numbering all picture elements to one of which neighboured correction data $E_b$ is added, within a second scanning window which has a size corresponding to M picture elements so as to scan said second image signal memory means, in accordance with one of ascending and descending orders of the image signal levels;

rearrangement circuit means for dividing said C, A and O into upper U bits data and lower L bits data and assigning the upper U bits of C as an image signal level to N picture elements of M-1 picture elements except predetermined rearranged one in said first image signal memory means ordered by said preference circuit, the upper U bits of A as an image signal level to a next picture element, and the upper U bits of O as an image signal level to remaining picture elements, for calculating a sum S, of the lower L bits of the image signal levels corresponding to said M-1 picture elements as a renewed rearrangement correction data, and for assiging all bits data to said predeterminal rearranged picture element, means for comparing an image signal level of rearranged picture element with a predetermined quantizing level V for $O \leq V < C$, and for assigning C to the image signal level when the image signal level is greater than the quantizing level V as a binary image signal and assigning O to the image signal level when the image signal level is smaller than the quantizing level V as another binary image signal, and operating the error correction data $E_a$ from the difference of the image signal level and the assigned binary image signal, third memory means for storing preference correction data, a first calculating means for calculating the neighboured correction data $E_b$ by the preference correction data neiboured to the referred picture element corresponding to that in said first or second scanning window and, a second calculating means for calculating renewed preference correction data which are to be stored into address corresponding to the referred picture element with the preference correction data read out from said third memory, image signal level of the referred picture element in said second image signal memory and the binary image signal level.

11. An apparatus as claimed in claim 10, wherein said neighboured correction data $E_b$ is calculated by multipying a coefficient $\frac{1}{2}^n$ to a mean value of the preference correction data neighboured to the referred picture element, where n is an positive integer.

12. An apparatus as claimed in claim 10 wherein said renewed preference correction data is calculated by adding a product of a coefficient $1\frac{1}{2}^m$ and a mean value of the preference correction data neighboring to the refered picture element to a difference between said image signal level of the refered picture element in said second image signal memory and the binary image signal level, where m is an positive integer.

13. An apparatus as claimed in claim 10, wherein said preference correction data neighboring to the referred picture element consists of upper U bit preference correction data and lower L bit preference correction data, and said third memory means stores said upper U bit preference correction data.

14. An apparatus as claimed in claim 10, wherein means are provided for operating upon preference correction data, said means calculating a mean value of data consisting of the upper U bit preference correction data and O inserted into a lower L bit, and adding the lower L bit preference correction data thereto.

15. An apparatus as claimed in claim 10, wherein means are provided for operating upon preference correction data, said means calculating a mean value of the upper U bit preference correction data as an upper bit and adds the lower L bit preference correction data thereto as a lower bit.

16. An apparatus for processing an image signal comprising:

a memory means for storing error data neighboring a referred picture element xy; a first calculating means for calculating a weighted mean value $E_w$ of said error data neighboring the referred picture element xy;

a second calculating means for adding original image data $I_{xy}$ and a mean error $E_a$ which consists of said weighted mean value $E_w$ as upper bits and lower bits data $E_{x-1,y}(L)$ of the error data of one picture element before as lower bits to obtain a value $I'xy(=E_a+I_{xy})$;

a comparator for comparing said value $I'xy$ within a predetermined value to obtain binary signal $P_{xy}$;

a third calculating means for calculating a difference between said value $I'xy$ and binary signal $P_{xy}$ as the error data $E_{xy}$;

a means for supplying upper U bits data of said error data $E_{xy}$ to said memory means, and a means for holding lower L bits data of said error data $E_{xy}$ until next picture element processing.

17. An apparatus as claimed in claim 16, wherein said weighted mean value $E_w$ is calculated with data consisting of said error data as upper bits data and L bits O data inserted as lower bits data, and said mean error $E_a$ is obtained by adding the thus obtained weighted mean value $E_w$ and said lower bits data $E_{x-1,y}(L)$ of the error data of one picture element before.

* * * * *